United States Patent [19]
Gaebe

[11] Patent Number: 6,026,206
[45] Date of Patent: Feb. 15, 2000

[54] OPTICAL COUPLER USING ANAMORPHIC MICROLENS

[75] Inventor: Carl Edward Gaebe, Fleetwood, Pa.

[73] Assignee: Lucent Technologies, Inc., Murray Hill, N.J.

[21] Appl. No.: 09/036,636

[22] Filed: Mar. 6, 1998

[51] Int. Cl.[7] ....................................................... G02B 6/32
[52] U.S. Cl. .............................................. 385/33; 385/88
[58] Field of Search ................................. 385/33, 34, 35, 385/88, 89, 93

[56] References Cited

U.S. PATENT DOCUMENTS 5,701,373  12/1997  Oleskevich .................................. 385/33
5,745,625   4/1998  Aikiyo et al. ............................... 385/93

OTHER PUBLICATIONS

J.J. Snyder et al., "Fast diffraction–Limited cylindrical microlenses", *Applied Optics*, vol. 30, No. 19, Jul. 1991, p. 2743.

J.J. Synder et al., "Fast, inexpensive, diffraction limited cylindrical microlenses", SPIE, vol. 1544, 1991, p. 146.

S.W. Connely et al., "Diffraction Limited Virtual Point Source Microlenses", SPIE, vol. 2383, 1995, p. 252.

J. Braat, "Design of beam shaping optics", *Applied Optics*, vol. 34, No. 15, May 1995, p. 2665.

*Primary Examiner*—Hung N. Ngo

[57] ABSTRACT

An optical coupling arrangement comprises conventional focusing optics and an anamorphic (i.e., radially non-symmetric) lens positioned at the entrance to the optical fiber. The objective lens focuses the elliptical beam exiting a laser source and the anamorphic lens functions to change the beam mode from elliptical to circular. The positioning of the anamorphic lens at the fiber input (instead of the laser output) reduces the alignment tolerance problems associated with prior art arrangements.

5 Claims, 1 Drawing Sheet

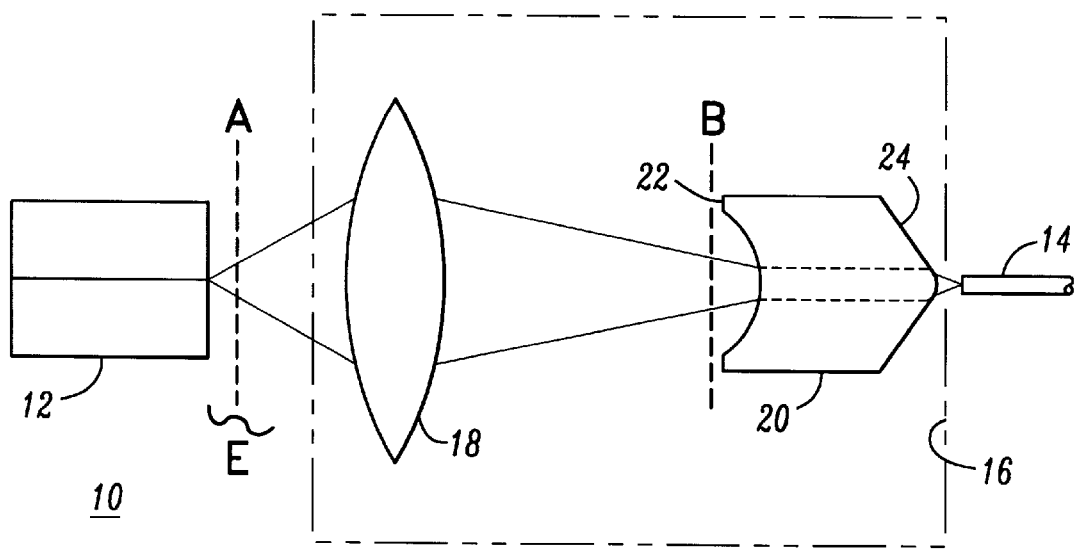
FIGURE

OPTICAL COUPLER USING ANAMORPHIC MICROLENS

BACKGROUND OF THE INVENTION

1. Technical Field

The present invention relates to an optical coupler and, more particularly, to an optical coupler including an anamorphic lens in combination with conventional focusing optics to improve coupling efficiency between a laser transmitter and an optical fiber.

2. Description of the Prior Art

Many diode lasers, especially 980 nm erbium-doped fiber pump lasers, have an elliptical beam pattern in which one axis is much faster than the other. That is, the numerical aperture in the perpendicular direction may be approximately sin (30°) (referred to as the "fast axis"), while the numerical aperture in the parallel direction may be approximately sin (10°) (referred to as the "slow axis"). This difference in numeral aperture makes it difficult to achieve high coupling efficiencies into a single mode fiber.

Several solutions have been proposed and implemented. One solution involves collimating the laser beam and using prism beam expanders to re-form one axis of the beam before focusing the beam into the fiber. See, for example, the article entitled "Design of beam-shaping optics" by J. Braat appearing in *Applied Optics*, Vol. 34, No. 15, May 20, 1995, at page 2665. Another solution is to use an anamorphic objective lens placed in front of the laser to reduce the divergence in the fast axis. This solution is discussed in detail in an article entitled "Diffraction Limited Virtual Point Source Microlenses" by S. W. Connely et al appearing in *SPIE*, Vol. 2383, 1995, at page 252. As discussed in the Connely et al article, the reduction of the divergence in the fast axis results in the beam seeming to emanate from a point source. While the use of such an anamorphic lens with the laser source is a useful solution, the combination has inherently tight alignment tolerances. In particular, the tolerances are on the order of 0.5 micron, resulting in an arrangement that is difficult to implement in a manufacturing environment.

SUMMARY OF THE INVENTION

The problem remaining in the prior art is addressed by the present invention, which relates to an optical coupler and, more particularly, to an optical coupler including an anamorphic lens in combination with conventional focusing optics to improve coupling efficiency between the laser source and an associated optical fiber. The conventional focusing optics is disposed at the output of the laser and an anamorphic lens is interposed between the focusing optics and the optical fiber, where the anamorphic lens is used to correct for the ellipticity in the laser output beam.

In particular, an exemplary embodiment of the present invention uses a conventional objective element to focus the laser output beam toward the endface of an associated optical fiber. The output beam from the laser remains elliptical in form as it passes through the objective lens. An anamorphic lens (i.e., radially non-symmetric lens) is positioned at the fiber entrance to capture the focused elliptical beam exiting the objective lens. The anamorphic lens comprises a concave first face and a convex second, opposite face, and is oriented such that the convergence of the fast axis beam is aligned with the convergence of the slow axis beam as the beams exit the lens, thereby resulting in an essentially circular beam face coupled into the associated fiber.

It is an aspect of the present invention that the utilization of an anamorphic lens at the fiber input reduces the alignment tolerances when compared with the prior art arrangement of coupling an anamorphic microlens to a laser endface. Additionally, since the anamorphic lens coupled to the fiber, the arrangement of the present invention may be designed for a lower numerical aperture relative to that of the prior art (that is, the lens can be made larger and with a longer total focal length, with greater tolerances on the involved surfaces).

Other and further advantages of the present invention will become apparent during the course of the following discussion and by reference to the accompanying drawing.

BRIEF DESCRIPTION OF THE DRAWING

The sole FIGURE illustrates an exemplary optical system using the coupling arrangement of the present invention, utilizing a single cylindrical lens as the anamorphic lens.

DETAILED DESCRIPTION

An exemplary optical system 10 is illustrated in the FIGURE. System 10 includes a conventional semiconductor laser 12, such as a 980 nm pump laser, and a single mode fiber 14, where the intent is to provide maximum optical coupling between laser 12 and fiber 14. Coupling arrangement 16 of the present invention comprises an objective lens 18 and an anamorphic lens 20 disposed so as to provide an improved degree of coupling. As is well known, the light exiting a semiconductor source such as laser 12 is strongly elliptical, meaning that the numerical aperture in the perpendicular direction ("fast axis") may be approximately sin(30°), while the numerical aperture in the parallel direction is approximately sin (10°) ("slow axis"). In fact, without some sort of "beam shaping" correction, the coupling efficiency associated with such an elliptical beam is in the range of approximately 25–40%.

In accordance with the optical coupling arrangement of the present invention, improved coupling is achieved by first focusing the elliptical beam E exiting laser 12 through a conventional, highly corrective lens system, such as radially symmetric objective lens 18. It is to be understood that other arrangements for providing beam focusing, including combinations of lenses and/or lens-prism combinations, may also be used and are well-known in the art. Although lens 18 will convert the diverging beam into a converging beam, the beam will remain elliptical in form. To correct this ellipticity, an anamorphic (i.e., radially non-symmetric) lens 20 is used. In particular, anamorphic lens 20 comprises a first, concave endface 22 and a second, convex endface 24. As elliptical beam E impinges concave endface 22, the convergence of the rays traveling along the "slow" axis will be reduced. Convex endface 24 then functions to focus the beam traveling along the slow axis. As a result of these operations, the beam exiting lens 20 will be essentially circular in shape and therefore matched to the characteristics of optical fiber 14 such that maximum coupling efficiency can be achieved.

In contrast to prior art systems that utilize an anamorphic lens positioned in the divergent beam near the exit of the laser to change the elliptical beam into a circular beam (point A in the FIGURE), the use of the radially symmetric objective lens and the positioning of the anamorphic lens in the convergent beam near the entrance of the optical fiber in accordance with the present invention (point B in the FIGURE), allows for the coupling to be achieved with an anamorphic lens used at a much lower numerical aperture.

Therefore, diffraction-limited performance can be easily achieved and the lens can be somewhat larger than that used with prior art systems. Further, the reduction in the useful numerical aperture in the convergent beam near the fiber results in reduced alignment tolerances for the arrangement of the present invention (e.g., tolerances on the order of 3 microns for the present invention versus approximately 0.5 micron for the prior art arrangement).

In general, any anamorphic lens may be used in the arrangement of the present invention as long as the lens comprises a pair of powered surfaces capable of transforming an essentially elliptical beam into an essentially circular beam. The powered surfaces used in the preferred embodiment are concave surface 22 and convex surface 24.

What is claimed is:

1. An arrangement for providing optical coupling between a laser source and an optical fiber, the laser source producing an elliptical beam pattern including a first section propagating along a fast axis and a second section propagating along an orthogonal, slow axis, the arrangement comprising objective focusing means for focusing the divergent elliptical beam exiting a laser source into a convergent elliptical beam propagating toward an optical fiber; and an anamorphic lens disposed at the output of the objective focusing means for increasing the convergence of the second section traveling along the slow axis to essentially match the convergence of the first section propagating along the fast axis and convert the elliptical beam into a substantially circular beam, the substantially circular beam thereafter coupled into the optical fiber.

2. An arrangement as defined in claim 1 wherein the anamorphic lens includes a concave first endface and a convex second endface and is positioned such that the beam exiting the objective focusing means impinges the concave endface and the beam exiting the convex endface impinges the optical fiber.

3. An optical coupling arrangement as defined in claim 2 wherein the second endface is spherical.

4. An optical coupling arrangement as defined in claim 2 wherein the first end is spherical.

5. An optical coupling arrangement as defined in claim 2 wherein both the first and the second endfaces are spherical.

* * * * *